United States Patent [19]
Christensen et al.

[11] Patent Number: 5,555,377
[45] Date of Patent: Sep. 10, 1996

[54] SYSTEM FOR SELECTIVELY COMPRESSING DATA TRANSFERRED IN NETWORK IN RESPONSE TO PRODUCED FIRST OUTPUT WHEN NETWORK UTILIZATION EXCEEDS FIRST THRESHOLD AND DATA LENGTH OVER LIMIT

[75] Inventors: Kenneth J. Christensen, Apex; Steven E. Polge, Cary; Anthony D. Walker, Durham, all of N.C.

[73] Assignee: International Business Machines Corporation, Armonk, N.Y.

[21] Appl. No.: 168,613

[22] Filed: Dec. 20, 1993

[51] Int. Cl.$^6$ .................................................. G06F 13/00
[52] U.S. Cl. ..................... 395/200.11; 370/85.13; 364/222.2; 364/284.4; 364/285.4; 364/DIG. 1
[58] Field of Search ............................. 395/200, 200.01, 395/200.02, 200.10, 200.11, 200.13, 200.18, 200.21; 370/84, 118, 85.13, 94.1, 110.1, 60.1, 79, 85.1, 95.1

[56] References Cited

U.S. PATENT DOCUMENTS

| | | | |
|---|---|---|---|
| 5,018,136 | 5/1991 | Gollub | 370/60.1 |
| 5,164,980 | 11/1992 | Bush et al. | 379/53 |
| 5,307,413 | 4/1994 | Denzer | 380/49 |
| 5,325,423 | 6/1994 | Lewis | 379/90 |
| 5,375,070 | 12/1994 | Hershey et al. | 364/550 |
| 5,392,223 | 2/1995 | Caci | 364/514 |
| 5,442,630 | 8/1995 | Cagliardi et al. | 370/85.13 |

FOREIGN PATENT DOCUMENTS

| | | |
|---|---|---|
| 0468910 | 6/1991 | European Pat. Off. . |
| 1248848 | 10/1989 | Japan . |
| 9221188 | 11/1992 | WIPO . |

OTHER PUBLICATIONS

*IBM Technical Disclosure Bulletin*, "Time–Based Compression Selection Line Detector Methodology." vol. 35, No. 6, Nov. 1992, p. 394.

ICL Technical Journal, vol. 8, No. 2, Nov. 1992, Oxford GB pp. 225–249, XP320459 M. Taylor "FDDI–The High Speed Network for the Nineties".

*Primary Examiner*—Thomas C. Lee
*Assistant Examiner*—Moustafa Mohamed Meky
*Attorney, Agent, or Firm*—Joscelyn G. Cockburn; George E. Clark

[57] ABSTRACT

A data communications system including a network and a number of data communication stations attached to the network wherein each of the stations includes a processor, a memory, a bus, and a communications adaptor for operatively connecting the processor and memory to the network, the communications adaptor including a means for monitoring network activity on a real time basis and enabling or disabling data compression when network activity exceeds a predetermined threshold.

5 Claims, 7 Drawing Sheets

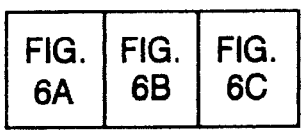
FIG. 6
FIG. 6A
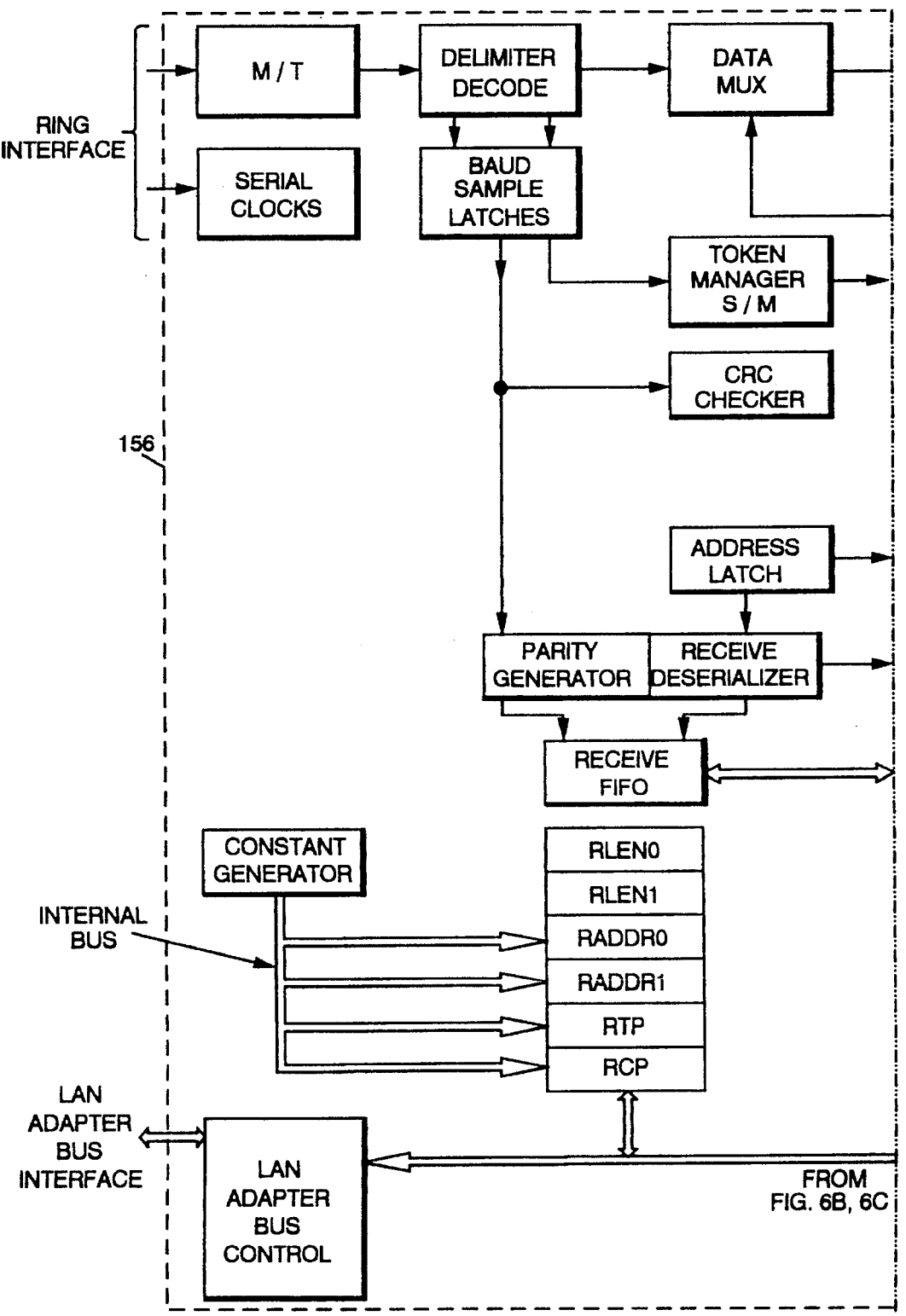

SYSTEM FOR SELECTIVELY COMPRESSING DATA TRANSFERRED IN NETWORK IN RESPONSE TO PRODUCED FIRST OUTPUT WHEN NETWORK UTILIZATION EXCEEDS FIRST THRESHOLD AND DATA LENGTH OVER LIMIT

BACKGROUND OF THE INVENTION

The present invention relates to data communications between computer based stations in a network and more particularly to data communications between computer-based stations in a network wherein data is selectively compressed and decompressed to improve network utilization and efficiency.

1. Prior Art

In some network systems, network data bandwidth requirements may increase during busy periods of the day. In many respects, the requirement for data bandwidth varies over the period of a day in a manner similar to the requirement for electric power which varies from peak hours during the daytime to relatively low demand during the early morning hours.

If all the data transmitted across a network are compressed by a predetermined ratio such as two to one, the effective bandwidth of the network is approximately doubled. Using data compression is a much more cost effective and efficient solution to the bandwidth requirement problem than upgrading the network to a faster data rate which would require replacement of very expensive hardware in the system.

Also, employing a compression technique which is hardware based requires new network adapter card designs. This also results in a higher cost.

A software-based compression could use existing adapter cards, but software-based compression requires a large number of system processor cycles which is wasteful when compression is not required, for example, when network utilization is low.

An article in the IBM Technical Disclosure Bulletin, Volume 35, Number 6, published November 1992, at page 394 entitled "Time-based Compression Selection Line Detector Methodology" describes a technique for periodically polling network activity and comparing data transfer time to the time required to compress the same block of data. The technique described in the article is intrusive in that it sends a frame into the network to discover buffer transfer times. This limits the responsiveness of the system and contributes to network and target station load. Contributing to network load during times of high network activity is not a good way to improve network responsiveness. Further, the technique described in the article does not measure network utilization. There are various other reasons than high network utilization that may cause a timed poll to take a "long time." For example, if the target station is busy, the timed poll may indicate a busy network, and the implementation of data compression may actually degrade system performance. Also, the technique measures samples which may yield an inaccurate representation of the average utilization over the sampling period since the sampling period is so long, the recommendation being ten minutes.

The article does not teach nor suggest a dynamic system for efficient data transfer in which data is automatically compressed when network activity exceeds a predetermined threshold.

SUMMARY OF THE INVENTION

Accordingly, the present invention includes a data communications system including a network and a number of data communication stations attached to the network wherein each of the stations includes a processor, a memory, a bus, and a communications adaptor for operatively connecting the processor and memory to the network, the communications adaptor including a means for monitoring network activity on a real time basis and enabling or disabling data compression when network activity exceeds a predetermined threshold.

It is an advantage of the present invention that more efficient utilization of a data communications network is achieved by use of the system according to the present invention where data compression is only employed when network activity is high and compression would relieve roadblocks to communication.

The foregoing and other objects, features, and advantages of the invention will be apparent from the following more particular description of a preferred embodiment of the invention as illustrated in the accompanying drawing in which like reference characters referred to the same parts throughout the different figures.

BRIEF DESCRIPTION OF THE DRAWINGS

For a more complete understanding of the present invention and the advantages thereof, reference is now made to the following descriptions taken in conjunction with the accompanying drawings,, in which.

DETAILED DESCRIPTION OF A PREFERRED EMBODIMENT OF THE INVENTION

Figure 1:
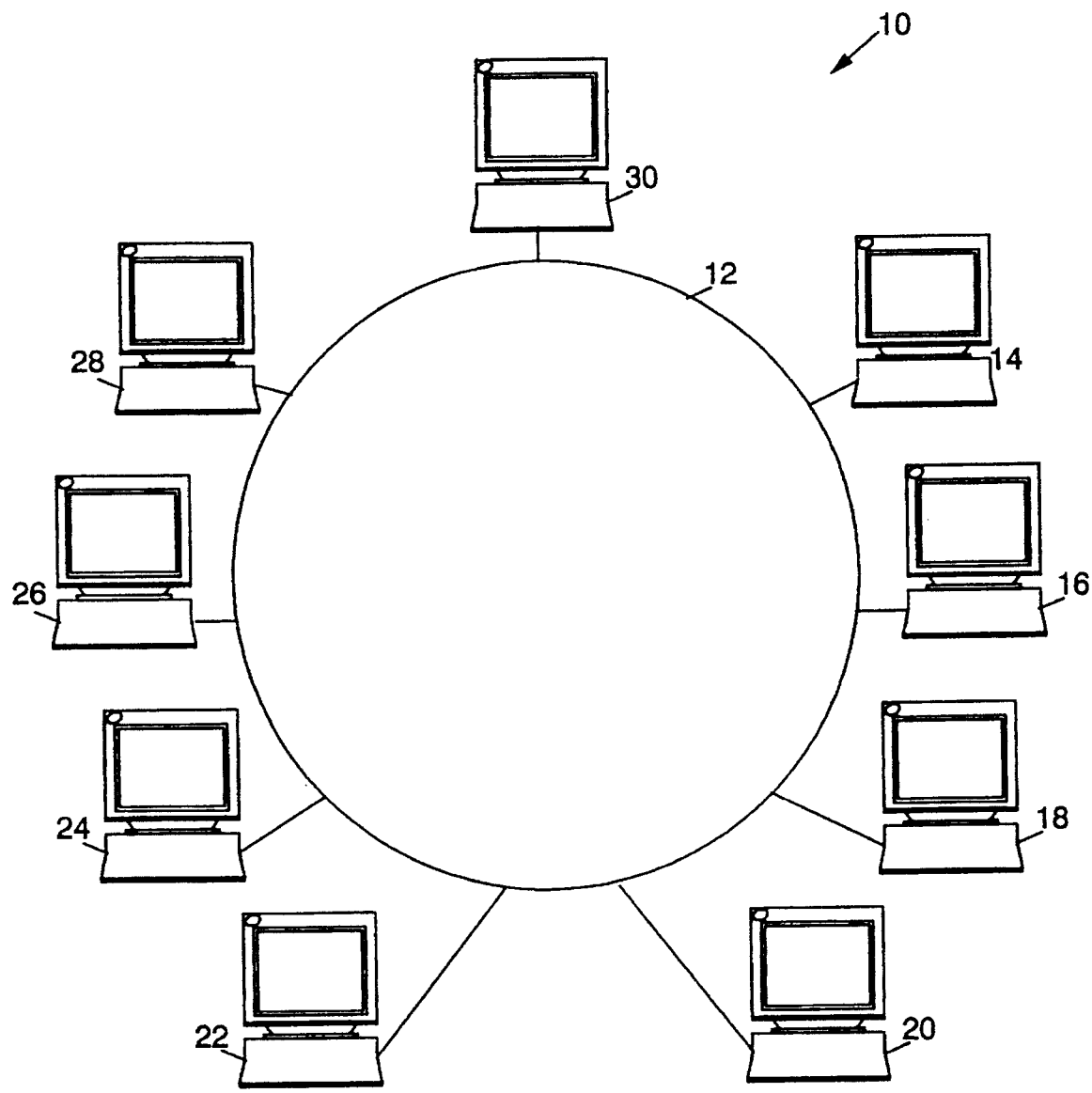
FIG. 1 is a schematic diagram of a data communications system according to the present invention.

Referring now to FIG. 1, a data communications system according to the present invention will be described. Data communications system 10 includes network 12 which may be implemented as a token ring local area network. Connected to the network 12 are a number of data communications stations, 14, 16, 18, 20, 22, 24, 26, 28, and 30.

Data is communicated from one station such as station 14 to another station such as station 26 on network 12. If many stations wish to communicate simultaneously with many other stations, it is possible that the utilization of the network will become very high resulting in reduced speed and efficiency of communications. In such case, to improve transmission of data on network 12, data compression is employed to effectively increase the data bandwidth of network 12.

Each of the data communication stations 14, 16, 18, etc. may be implemented by IBM* PS/2* personal computers.

*IBM and PS/2 are registered trademarks of International Business Machines Corporation.

Figure 2:
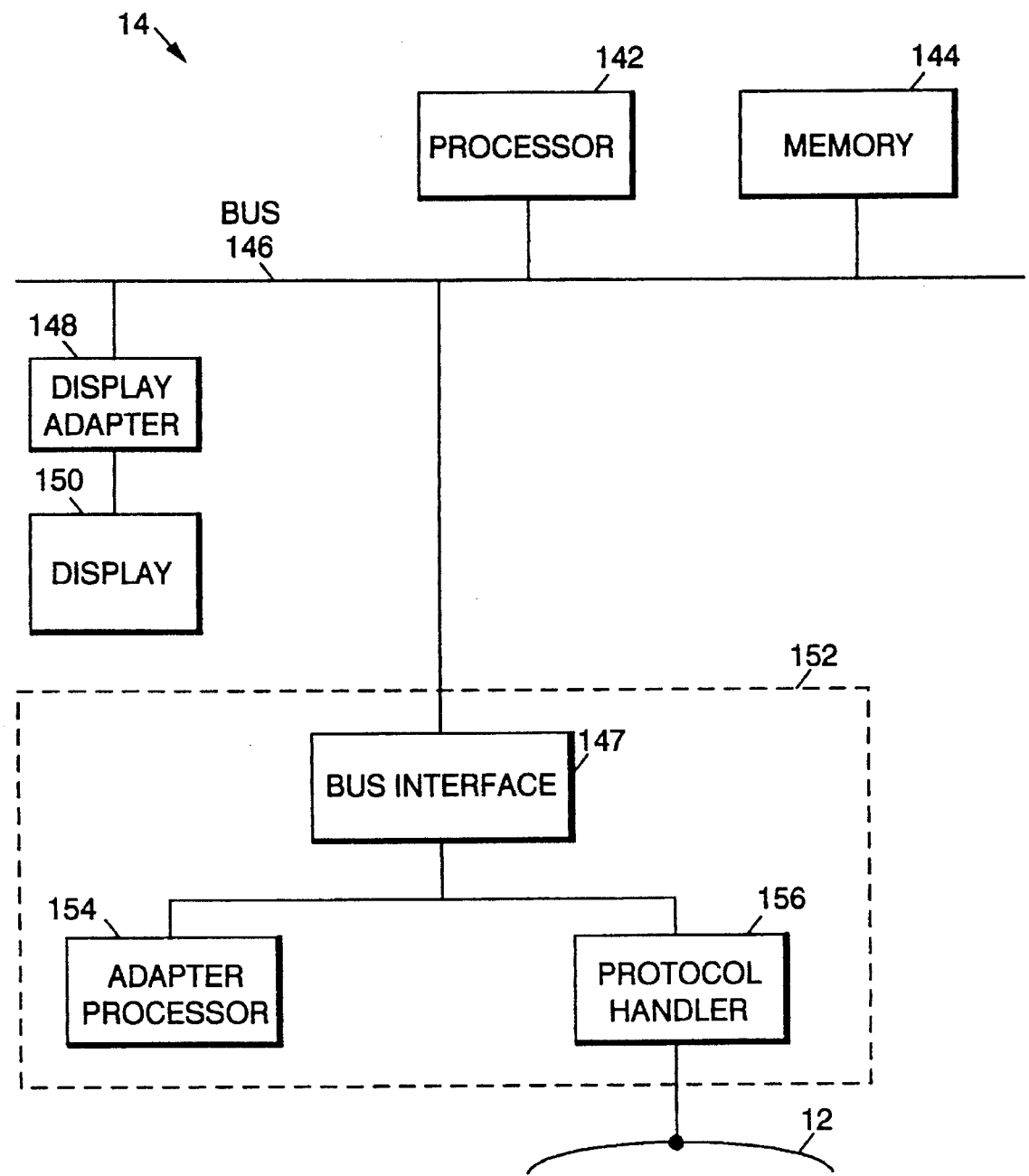
FIG. 2 is a block diagram of a data communications station in accordance with the system of FIG. 1.

Referring now to FIG. 2, a data communications station such as 14 will be further described.

Each station such as station 14 includes a processor 142, a memory 144, a bus 146 for transmitting control information and data between the elements of station 14, a display adaptor 148, a display device 150 and a communications adaptor 152. Communications adaptor 152 includes a bus interface 147, a processor 154 for control of communications with network 12 and a protocol handler 156 for implementing all aspects of data communications with network 12 including data transmission and reception, etc. Protocol handler 156 transmits a frame to the network by recognizing a token and appending a frame to the token. During receive operations, protocol handler 156 recognizes an incoming frame and checks the destination address to see if it should be received by the station.

Processor 142 operates under the control of a control program and application programs stored in memory 144. One of the applications which operate on processor 142 is the data compression application which is initiated by the monitoring of the activity of network 12. The data compression application program which is employed with the present invention may be any one of a number of generally available data compression programs which are adapted to operate on an IBM PS/2 computer system and may employee the Ziv-Lempel data compression technique. The specific data compression program or technique employed to compress the data to be transmitted is not crucial to the present invention. Any one of a number of data compression techniques may be employed with equal effectiveness with respect to the present invention.

Figure 3:
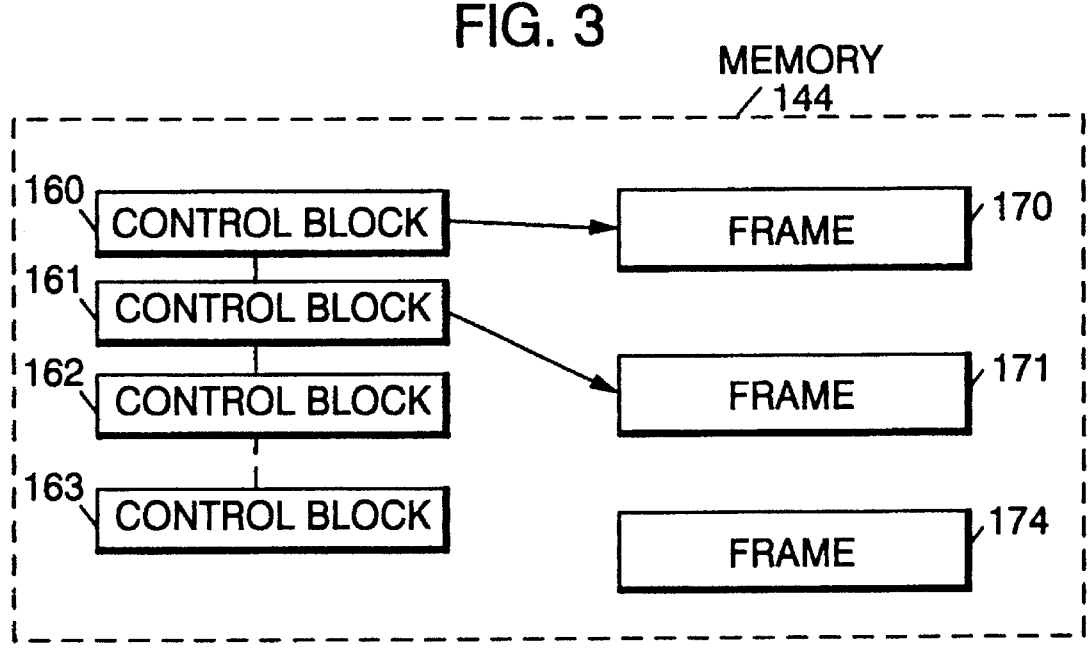
FIG. 3 is a diagram of the memory of FIG. 2 showing the relationship between control blocks and data frames within the system memory.

Referring now to FIG. 3, a layout of memory 144 will be described. A number of program control blocks, 160, 161, 162 and 163 are each associated with one data frame to be transmitted over the network 12. For example, control block 160 is associated with data frame 170, control block 161 is associated with data frame 171, etc. The actual transmission of data frames such as 170, 171, 174 is controlled by communications adaptor 152.

The primary purpose of transmit control blocks 160 . . . 163 is to store system memory addresses of memory blocks such as 170 . . . 174 which contain the frames to be transmitted on network 12. As such, the control blocks 160 . . . 163 store address, frame length and status bits. Bus interface block 147 (see FIGS. 2 and 4) reads control blocks 160 . . . 163 and transfers frames stored in memory blocks 170 . . . 174 to adaptor 152 across system bus 146.

Control blocks 160 . . . 163 are used for both receiving and transmitting frames. For receiving, control blocks point to empty memory blocks into which received frames are transferred from network 12 via adaptor 152.

Control blocks are typically linked together as a linked list. It should be noted that it is possible for a single frame of data to be spread over multiple memory blocks 170 . . . 174. In such a case, more than one control block 160 . . . 163 points to all of the memory blocks 170 . . . 174 containing data in the spread frame.

Figure 4:
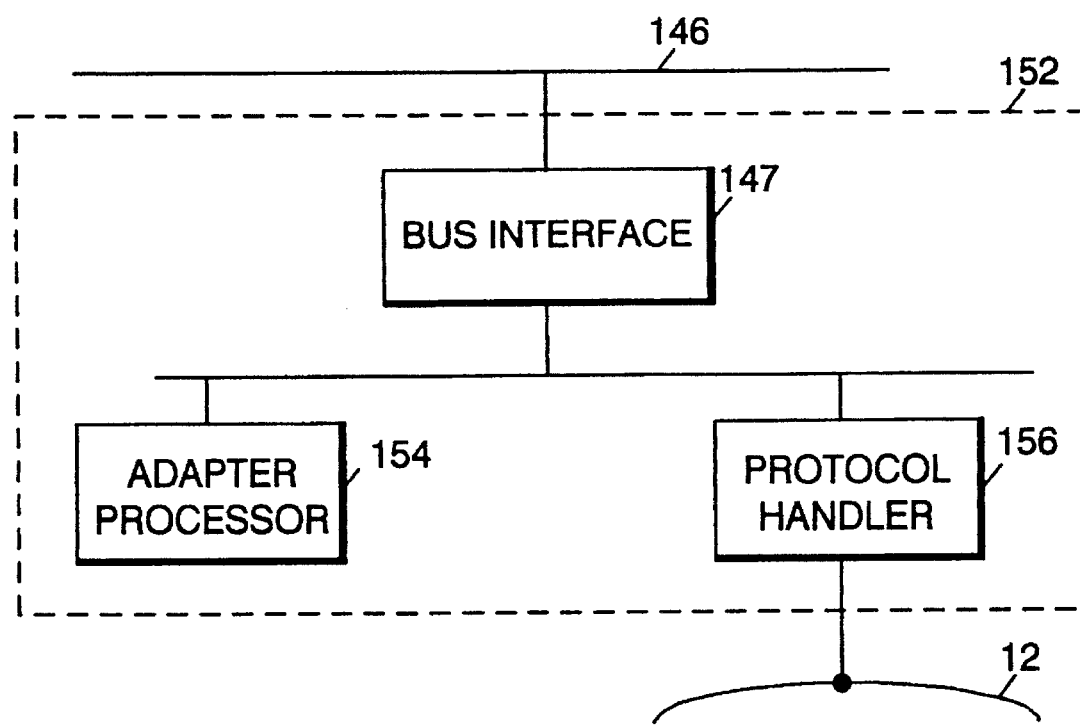
FIG. 4 is a block diagram of a communications adaptor as shown in FIG. 2 in accordance with the present invention.

Referring now to FIG. 4, communications adaptor 152 will be described in greater detail. Communications between the system bus 146 and the communications adaptor 152 is under the control of bus interface 147 which communicates between the system processor 142 and the adaptor processor 154 and the protocol handler 156.

Figure 5:
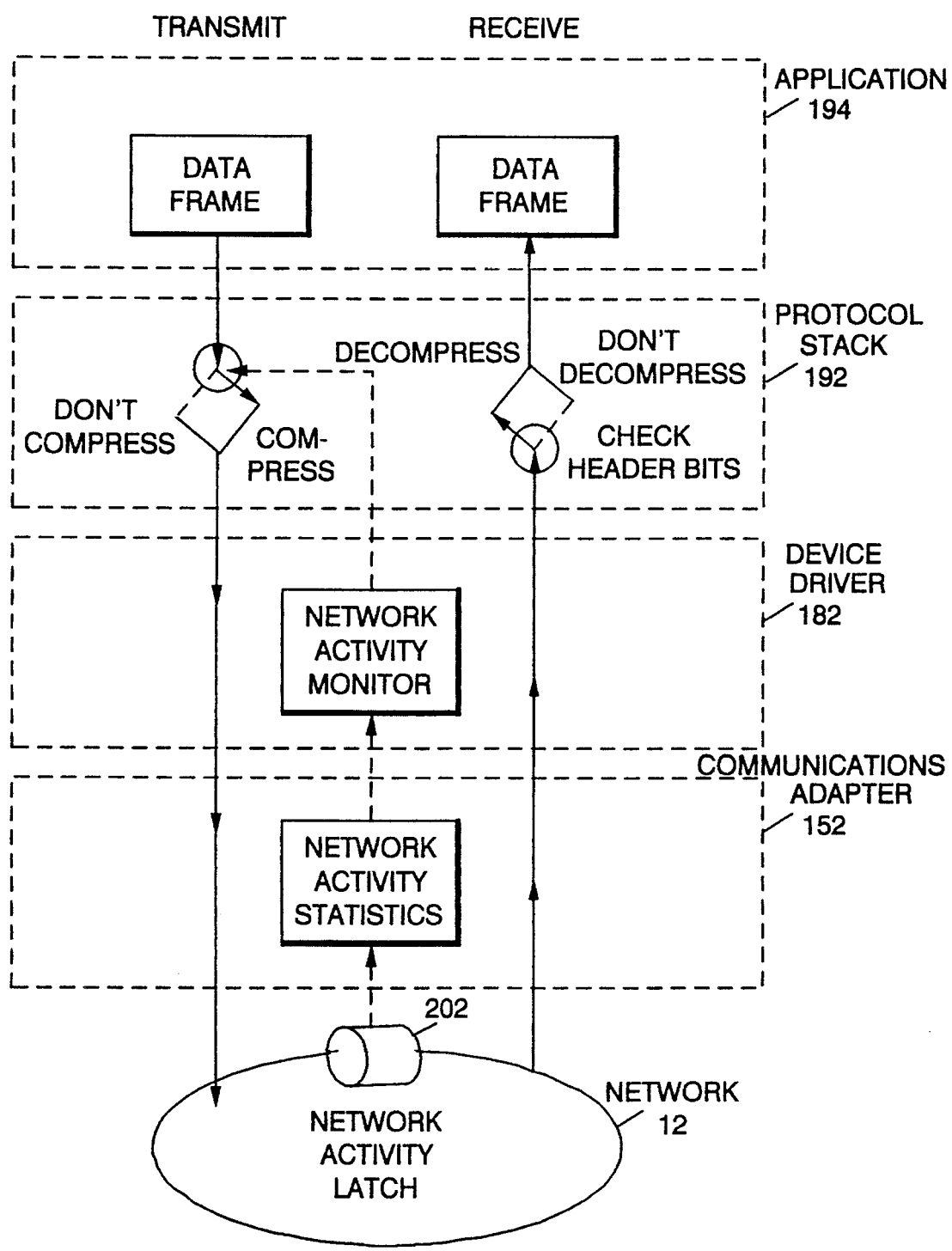
FIG. 5 is a combination block diagram and flow diagram of the adaptive data compression process in accordance with the present invention.

Referring now also to FIG. 5, the protocol handler 156 includes a network activity monitor circuit which along with the network activity statistics routine executing in adaptor processor 154 determines the level of activity on network 12. The statistics routine is imbedded in the microcode associated with adaptor processor 154.

The network activity statistics routine operates to determine the operation of the network activity monitor and the initiation of data compression or decompression.

Network activity latch 202 is set when a valid free token is detected on network 12 and reset when a busy token indicating a data frame is detected on network 12. Adaptor processor 154 executes the network activity statistics routine. The program code for the network activity statistics routine is as follows:

---
Network Activity Statistics Routine
---

DEFINITIONS:
- util_flag :  Set when hardware detects valid free token. Reset when,
  - Hardware detects frame (busy token)
  - Hardware detects token with Code Violation in priority bits (AC 0, 1, 2)
  - Hardware detects signal loss condition
- max_count : Maximum count check, defines TEST period in seconds
- ring_available_count : Counts number of samples where ring was not busy
- loop_count : Counts SAMPLE periods till reaches max_count
- ring_utilization : Ring utilization calculate for last TEST seconds INITIALIZATION:
max_count = (initialized as TEST seconds / SAMPLE seconds)
ring_available_count = 0
loop_count = 0
ring_utilization = 0
TIMER INTERRUPT (every SAMPLE seconds):
if (util_flag = 1) increment ring_available_count
increment loop_count
if (loop_count = max_count)
    loop_count = 0
    ring_utilization = max_count - ring_available_count
    ring_available_count = 0

---

Processor 142 executes a network activity monitor routine in device driver software in the data communications system. The device driver reads and resets a network activity counter every TEST seconds. Network activity counter is the value of the ring_utilization count from the microcode set forth above. If the count is greater than a predefined threshold, an interrupt is generated to the protocol stack 192 executed by processor 142 to turn on compression. If compression is enabled and if the count is less than a second predetermined threshold, an interrupt is generated to turn off compression. The first predetermined threshold is the network activity above which data should be compressed. A recommended value for the first threshold is 80 percent. The second threshold is the network activity below which data should not be compressed. A recommended value for the second threshold is 70 percent. The value of TEST is recommended to be five seconds, and the recommended value for SAMPLE is five milliseconds. With these recommended values, the variable network utilization is calculated in tenths of a percent over five second periods.

The code for the network activity monitoring routine is as follows:

---
Network Activity Monitoring Routine
---

DEFINITIONS:
ring_utilization : Ring utilization available from
    microcode routine
thresh_high : High threshold to turn on data
    compression
thresh_low : Low threshold to turn off data compression
comp_flag : Flag to indicate compression on (true) or
    off (false)
turn_on_data_compression : Interrupt parameter to turn
    on data compression. Interrupt is to code that does
    actual compression of frames.
turn_off_data_compression : Interrupt parameter to turn
    off data compression. Interrupt is to code that
    does actual compression of frames.
INITIALIZATION:
thresh_high = (Initialized as THRESH1 percentage)
thresh_low = (Initialized as THRESH2 percentage)
comp_flag = false
TIMER INTERRUPT (every TEST seconds):
if (ring_utilization > thresh_high) AND
    (comp_flag = false)
        interrupt(turn_on_data_compression)
        comp_flag = true
if (ring_utilization < thresh_low) AND
    (comp_flag = true)
        interrupt(turn_off_data_compression)
        comp_flag = false

---

Protocol stack 192 controls compression in response to the network activity monitor routine from device driver 182. Compression or decompression of data transmitted on network 12 is transparent to application 194.

Application 194 passes data to protocol stack 192 to transmit to another station. A compression routine such as the Ziv-Lempel compression discussed above is executed by processor 142 to compress the data blocks at the beginning of the protocol function before normal protocol operation occurs. Data frames 170, 171, 174 are then passed to device driver 182 for transmission across network 12 to another station 24. The compression function in protocol stack 192 also checks the size of data block 171 etc. If data block 171 etc. is smaller than a predetermined minimum, data block 171 should not be compressed even if network activity is high. This test prevents wasting system processor time on data blocks which are too small to effectively compress. A recommended value for the predetermined minimum is 4K (4096) bytes.

When data is received by station 14 from network 12, received data frames are tested for a compression bit being set. If the compression bit is set, a decompression routine decompresses the data within the frame, and the data is then passed to the application.

Two bits are defined in the protocol header of each data frame. They are a Support Bit and a Compress Bit. The Support Bit is set to 1 at session establishment if both stations 14 and 24, for example, in the session support compression. The Compress Bit is set to 1 if the data following the protocol header is compressed. The following table shows the possible combinations of the Support and Compress Bits.

| SUPPORT | COMPRESS | ACTION |
|---|---|---|
| 0 | 0 | This session does not support compression |
| 0 | 1 | Illegal |
| 1 | 0 | Supports compression, data is not compressed in this frame |
| 1 | 1 | Supports compression, data is compressed in this frame |

Figure 6B:
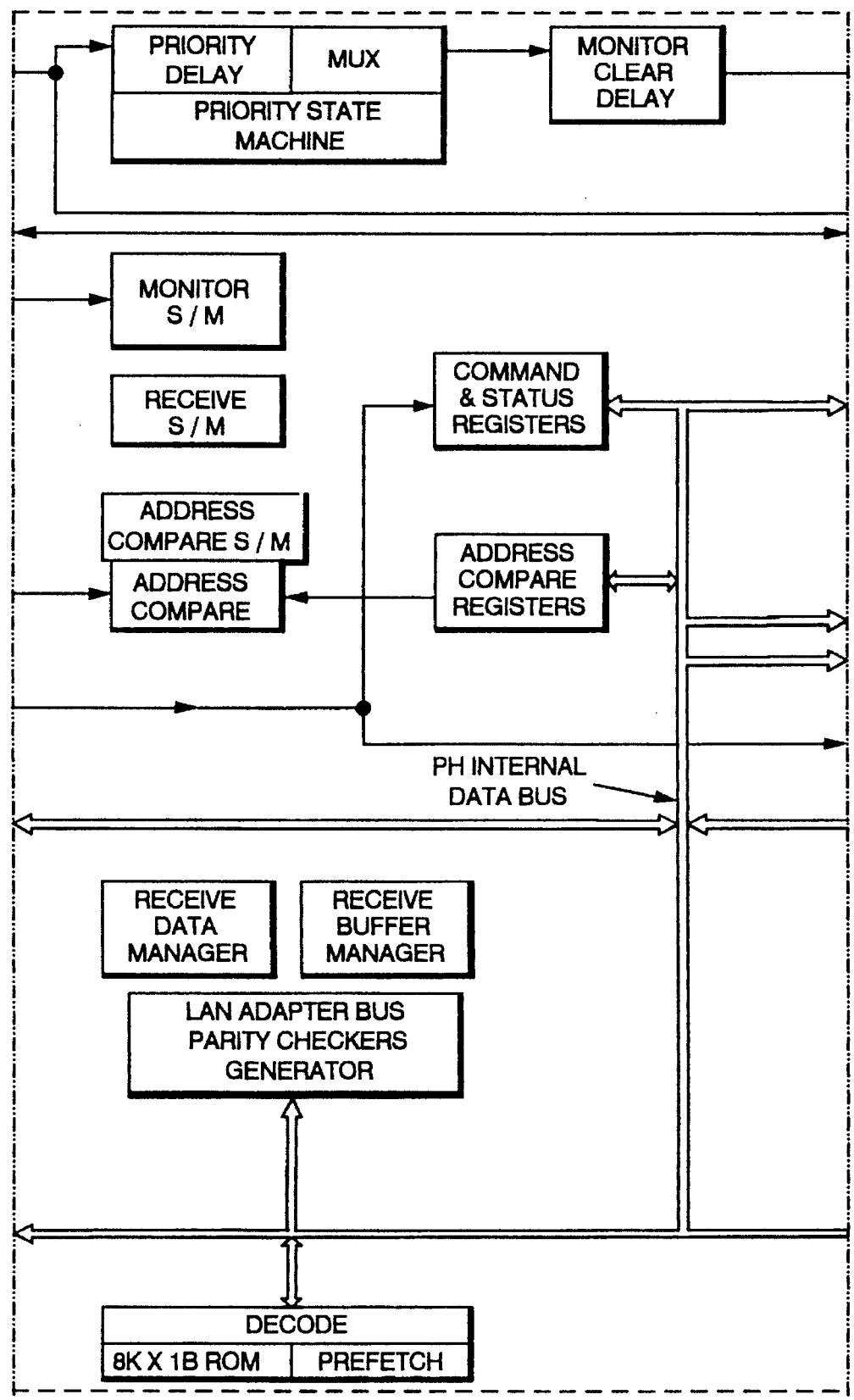
FIG. 6, which comprises of FIGS. 6A, 6B, and 6C, is a block diagram of a commercially available protocol handler which is representative of a protocol handler as shown in FIG. 4 in accordance with the present invention.
Figure 6C:
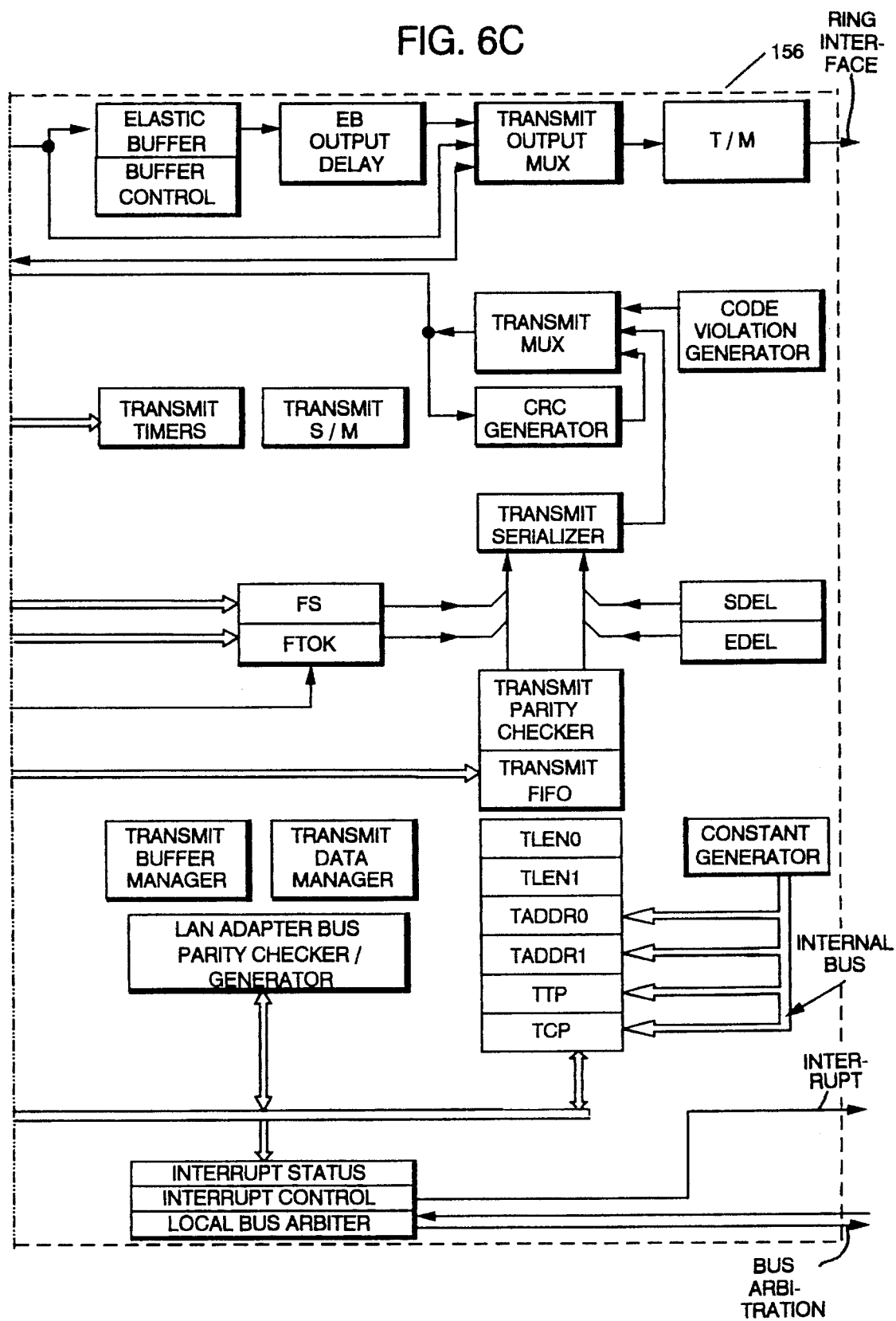

Protocol handler 156 is generally shown in FIG. 6. The protocol handler of FIG. 6, is a commercially available device and may be implemented by Texas Instruments protocol handler TMS 38020. Further information regarding the Texas Instruments protocol handler may be obtained from the Texas Instruments specifications for the TMS 38020.

The preferred embodiment of the invention as described above provides efficient data communications between data communications between stations in a network through the use of selective data compression which is activated only when network activity is high and which is totally transparent to the application program.

While the invention has been described with respect to a preferred embodiment thereof, it will be understood by those skilled in the art that various changes in detail and scope may be made without departing from the spirit or scope of the invention.

What is claimed is:

1. A data communications system for efficiently transferring data with variable length between two or more terminals in a network by selectively compressing the data, comprising:

two or more terminals connected via a token ring transfer medium in a network;

means in each terminal for monitoring network utilization by detecting the number of frames traveling over the network having a token busy during a predetermined time period, producing a first output when network utilization exceeds a first threshold and producing a second output when said network utilization is below a second threshold;

means associated with each of said terminals for compressing data, to be transmitted from the first terminal to a second terminal on said network, in response to said first output of said monitoring means when said variable data length is over a selected limit;

means for transmitting data from said first terminal to said second terminal on said network without compressing the data in response to said second output or the absence of said first output;

means associated with each of said terminals for detecting compressed data received by said second terminal;

means associated with each of said terminals for decompressing data, received by said second terminal, in response to an output of said detecting means; and means associated with each of said terminals for controlling said means for compressing and said means for decompressing such that said means for compressing and decompressing are operational only when the number of frames having a busy token, detected by said means for detecting, are above a predetermined number.

2. A method for efficiently transferring data with variable length between two or more terminals in a token ring network by selectively compressing the data, comprising the steps of:

monitoring networking utilization by detecting the number of frames traveling over the network having a token busy during a predetermined time period;

producing a first signal when said network utilization exceeds a first threshold;

producing a second signal when said network utilization is below a second threshold;

compressing data, to be transmitted from a first terminal to a second terminal on said network, in response to said first signal and said variable data length is over a selected limit;

transmitting data from said first terminal to said second terminal on said network without compressing the data in response to said second signal or the absence of said first signal;

detecting compressed data received by said second terminal; and decompressing data, received by said second terminal.

3. A method for efficiently transferring data with variable length between two or more terminals in a token ring network by selectively compressing the data, comprising the steps of:

identifying a block of data to be transmitted from a first terminal to a second terminal in a network;

sampling network activity by detecting the number of frames having a busy token traveling on said token ring network in a predetermined period of time;

determining from said sampling whether network activity exceeds a first threshold;

generating a first signal indicating that said block of data is to be compressed for efficient transmission to said second terminal;

generating a second signal when said network utilization is below a second threshold;

compressing said block of data in response to said first signal and said variable data length is over a selected limit;

transmitting said compressed block of data to said second terminal on said network without compressing the data in response to said second signal or the absence of said first signal;

detecting in said second terminal that said transmitted block of data is compressed;

generating a second signal indicating that said transmitted block of data is to be decompressed;

decompressing said block of data at said second terminal in response to said second signal.

4. A terminal for efficiently communicating data with variable length over, a network by selectively compressing the data, comprising:

a processor executing application programs, operating under control of a control program;

a memory for storing programs and data for use by said processor;

a bus for transferring control signals and data between said processor, said memory and one or more input/output adapters;

a token ring communications adapter, connected to said bus, for controlling transmission of data and control signals between said terminal and said network, said adapter comprising:

means contained within said terminal for monitoring network utilization by detecting the number of frames having a busy token passing over said network during a predetermined period of time, producing a first signal when network utilization exceeds a first threshold, and producing a second signal when said network utilization is below a second threshold;

means contained within said terminal for compressing data responsive to said first signal and said variable data length is over a selected limit, means contained within said terminal for transmitting data without compressing the data in response to said second signal or the absence of said first signal;

means contained within said terminal for detecting compressed data received by said terminal;

means for decompressing data, received by said terminal, in response to an output of said detecting means.

5. A communications adapter, for efficiently controlling variable length data communications over a token ring network by selectively compressing the data, comprising:

means for monitoring network utilization by detecting the number of frames having a token busy signal during a predetermined period of time, producing a first signal when network utilization exceeds a first threshold, and producing a second signal when said network utilization is below a second threshold;

means for compressing data responsive to said first signal and said variable data length is over a selected limit;

means for transmitting data without compressing the data in response to said second signal or the absence of said first signal;

means for detecting compressed data received by said adapter;

means for decompressing data, received by said adapter, in response to an output of said detecting means.

* * * * *